United States Patent
Ayandeh (10) Patent No.: US 10,298,458 B2
(45) Date of Patent: May 21, 2019

(54) DISTRIBUTED SYSTEM PARTITION

(71) Applicant: HEWLETT PACKARD ENTERPRISE DEVELOPMENT LP, Houston, TX (US)

(72) Inventor: Siamack Ayandeh, Littleton, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 143 days.

(21) Appl. No.: 15/504,195

(22) PCT Filed: Oct. 31, 2014

(86) PCT No.: PCT/US2014/063310
§ 371 (c)(1),
(2) Date: Feb. 15, 2017

(87) PCT Pub. No.: WO2016/068972
PCT Pub. Date: May 6, 2016

(65) Prior Publication Data
US 2017/0279683 A1    Sep. 28, 2017

(51) Int. Cl.
*H04L 12/24* (2006.01)
*H04L 12/755* (2013.01)
*H04L 12/721* (2013.01)
*H04L 12/413* (2006.01)
(Continued)

(52) U.S. Cl.
CPC ........ *H04L 41/0893* (2013.01); *H04L 12/413* (2013.01); *H04L 45/021* (2013.01); *H04L 45/44* (2013.01); *H04L 45/58* (2013.01); *H04L 47/621* (2013.01)

(58) Field of Classification Search
CPC ... H04L 41/0893; H04L 45/021; H04L 45/44; H04L 45/58
See application file for complete search history.

(56) References Cited

U.S. PATENT DOCUMENTS 7,362,709 B1 *   4/2008   Hui ..................... H04L 45/00
                                                    370/221
8,948,176 B1 *   2/2015   Desanti ................ H04L 45/44
                                                    370/351
(Continued)

FOREIGN PATENT DOCUMENTS

WO     WO-2009158217 A2    12/2009

OTHER PUBLICATIONS

"Detecting and Handling Network Segmentation ("Split Brain")", Nov. 5, 2009, pp. 1-2, VMware, Inc.
(Continued)

*Primary Examiner* — Robert C Scheibel
(74) *Attorney, Agent, or Firm* — Brooks, Cameron & Huebsch, PLLC (57) ABSTRACT

An example of a distributed system partition can include a method for client service in a distributed switch. The method can include maintaining local and global connection state information between a primary and a secondary controlling fiber channel (FC) over Ethernet (FCoE) Forwarders (FCFs) or FC forwarder in a distributed switch. A partition in the distributed switch can be detected and service to subtended clients of the distributed switch can continued using local state information.

17 Claims, 7 Drawing Sheets

(51) Int. Cl.
 *H04L 12/775* (2013.01)
 *H04L 12/863* (2013.01)

(56) References Cited

U.S. PATENT DOCUMENTS

| | | | |
|---|---|---|---|
| 2003/0188233 A1* | 10/2003 | Lubbers | G06F 11/2069 |
| | | | 714/100 |
| 2011/0176412 A1 | 7/2011 | Stine et al. | |
| 2012/0039163 A1* | 2/2012 | Nakajima | H04L 41/0654 |
| | | | 370/217 |
| 2013/0028135 A1 | 1/2013 | Berman | |
| 2013/0163607 A1 | 6/2013 | Shukla et al. | |
| 2013/0166773 A1 | 6/2013 | Armstrong et al. | |
| 2014/0233579 A1 | 8/2014 | Flynn et al. | |
| 2014/0269290 A1 | 9/2014 | Cors et al. | |
| 2015/0249587 A1* | 9/2015 | Kozat | H04L 43/10 |
| | | | 370/222 |
| 2015/0363254 A1* | 12/2015 | Satoyama | G06F 11/073 |
| | | | 714/57 |

OTHER PUBLICATIONS

"Distributed Data Management with VMware vFabric GemFire," Technical White Paper, Aug. 5, 2011, pp. 1-20, VMware, Inc.
International Search Report and Written Opinion, International Application No. PCT/US2014/063310, dated Jun. 11, 2015, pp. 1-8, KIPO.
Stephen Balukoff, "Distributed Systems Design," Apr. 9, 2012, pp. 1-35, Blue Box.

\* cited by examiner

| USE OF PARTITIONED ADDRESS SPACE ||
|---|---|
| INCOMING FRAME SOURCE_ID | OUTGOING FRAME OUTER HEADER SOURCE_ID |
| Z.1 | X.S1.1 |
| Z.2 | X.S1.2 |

Fig. 6A

| USE OF ADDITIONAL DOMAIN ID ||
|---|---|
| INCOMING FRAME SOURCE_ID | OUTGOING FRAME OUTER HEADER SOURCE_ID |
| Z.1 | X1.1 |
| Z.2 | X1.2 |

DISTRIBUTED SYSTEM PARTITION

BACKGROUND

Computing networks can include multiple network devices including network devices such as routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

High availability (HA) is a mode of operation for networks where redundant components are used to reduce service outage. The cost of high availability in FC/FCoE networks, measured in terms of the number of nodes, increases linearly with the number of switches in an HA cluster. Current HA solutions maintain a per connection state within a primary fibre channel over Ethernet (FCoE) forwarder (FCF) which is synchronized across a switch HA cluster to a secondary FCF. The model of operational control is active (primary)/standby (secondary) where all connection and fabric services intelligence is placed in the primary FCF (p/FCF) and synchronized with the secondary FCF (s/FCF). A primary/secondary FCF together with a set of FDF(s) define a virtual domain (or switch). Synchronization of connection state from a p/FCF to an s/FCF can lead to a number of issues.

DETAILED DESCRIPTION

Examples of the present disclosure may include network devices, systems, and methods, including executable instructions and/or logic thereon for continuous service in distributed systems. An example of a distributed system includes a fibre channel over Ethernet (FCoE) distributed system using a distributed switch concept under development in T11-SW6 standards.

Nodes constituting a distributed system exchange information to stay synchronized with respect to various events. This allows each node to be aware of not only its local state but also the global state of the distributed system. At times exchange of information is prohibited due to failures within the distributed system, e.g., due to failure of links interconnecting the nodes. So while the nodes are capable of continuing their operation, and providing services to their subtending clients, the "control" state of the nodes is no longer visible to the entire system, leading to loss of synchronization, and global state. This is referred to as a partition of the system or "split brain".

The nodes being referred to often perform control as well as switching functions. They may be referred to as controllers or forwarding controllers and are switching elements. Two or more such controllers form a distributed system or distributed switch or distributed domain.

A distributed system itself is part of a larger network of such systems. Externally a distributed system is viewed as a single entity or domain. Therefore, e.g., for routing purposes, the distributed system appears as one domain. The internal partition of the system is not visible to the rest of the network. Therefore, traffic destined to a partitioned domain may be lost or "black holed" and not reach its destination. Black holes lead to a loss of service. To remedy such a loss of traffic, one or more nodes may isolate themselves from the distributed system, and discontinue providing services to subtending clients. However, this results in outages for a large number of clients.

To reduce such a possibility of outages to a large number of clients, a method for continuous client service in a distributed system partition is provided. The method can include maintaining local and global connection state information between a primary and a secondary controlling fibre channel (FC) over Ethernet (FCoE) forwarder (FCFs) or fibre channel FC channel forwarder in a distributed switch. A partition in the distributed switch can be detected and service to subtended clients of the distributed switch can be continued using local state information. This allows the distributed system to recover from an event which caused the partition, e.g., link failures, without a loss of service.

To achieve the same, logic and/or instructions provide an alternate address which routes frames to a correct side of a partition, via a correct FCF, and by provides a tunneling mechanism between a controlling FCF(s) and the end switching hop (also referred to as a "penultimate switching hop") where a destination client resides. Thus, a distributed switch can use local state information to avoid loss of frame traffic and loss of network, e.g., fabric, service.

Figure 1:
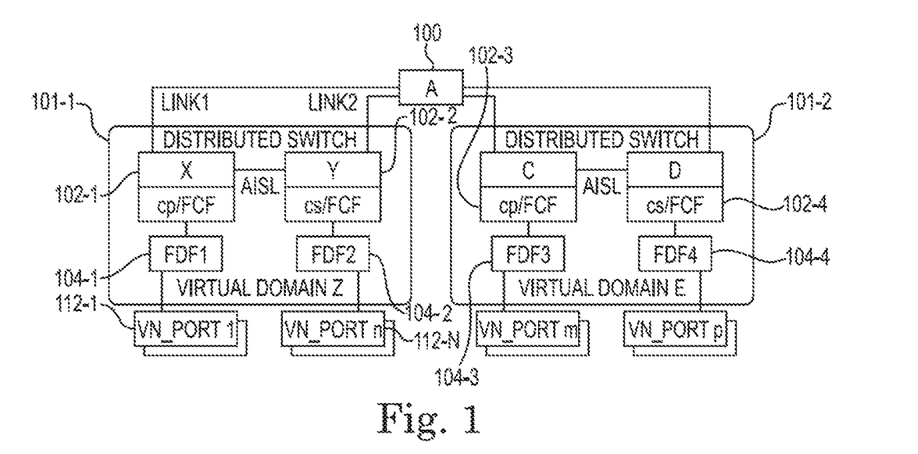
FIG. 1 illustrates an example of a distributed system including a plurality of distributed switches having virtual domains among various nodes as part of a switching fabric in a network according to the present disclosure.

FIG. 1 illustrates an example of a switch fabric connected to a number of distributed switches at a plurality of ports via a plurality of links. While examples herein are described in connection with distributed switches in a switch fabric, examples are not so limited and are equally applicable to any network of distributed systems.

In the example of FIG. 1, two distributed switches, 101-1 and 101-2, are shown connected to a switch fabric "A" 100. Switch fabric A 100 can include another switch and can be connected to more than two distributed switches. For ease of illustration, each of the distributed switches is shown connected to the switch fabric by two separate links, Link 1 and Link 2. However, each distributed switch can be connected to the switch fabric A 100 by many links. As shown in FIG. 1, each distributed switch is seen by the switch fabric A 100 as a single entity or domain. Hence, distributed switch 101-1 can be identified as virtual domain "Z" and distributed switch 101-2 can be identified as virtual domain "E". Together these virtual domains, e.g., virtual domain Z (101-1) and virtual domain E (101-2), form various nodes as part of a FC switching fabric 100 between switches in a network.

As shown in FIG. 1, each virtual domain can be defined by nodes including fibre channel over Ethernet (FCoE) forwarder or fibre channel forwarder (FCF) sets, 102-1 and 102-2, and fibre channel over Ethernet data forwarder (FDF) sets, 104-1 and 104-2, etc. That is, the FCFs and the FDFs are referred to herein as "nodes". The numbers and relationship between FCF and FDF sets may be established by configuration. In FIG. 1 distributed switch 101-1 identified as virtual domain "Z" is shown with an FCF 102-1 identified "X" and an FCF 102-2 identified as "Y". Similarly, distributed switch 101-2 identified as virtual domain "E" is shown with an FCF 102-3 identified as "C" and an FCF 102-4 identified as "D".

In FIG. 1, each FCF, 102-1 and 102-2, can serve as a controlling FCF with one serving as a "primary" controlling FCF (cp/FCF) and the other serving as a "secondary" controlling FCF (cs/FCF). In this example, the "primary" controlling FCF (cp/FCF) acts as the "brain" to the distributed switch by maintaining local and global state information between the two FCFs. In this example the two FCFs, 102-1 and 102-2, are shown interconnected by a link, e.g., an augmented interconnect switch link (AISL). The global state information referred to herein is intended to mean the global state information pertaining to the distributed switch 101-1 of virtual domain "Z", and not the entire switch fabric. The global state information is the information which is exchanged between the FCFs 102-1 and 102-2 so that they can behave and function as one switch. By contrast, local state information as used herein includes state information relating only to that particular node.

The virtual domains, 101-1 and 101-2, can form part of a storage area network (SAN) switching fabric (SAN fabric) 100. A SAN Fabric 100 is a collection of fibre channel (FC) switches and/or fibre channel over Ethernet (FCoE) forwarders (FCF) which share a fibre channel fabric mapping (FCF_MAP) and run fabric protocols over their "E" ports (E_Ports) and/or virtual E_Ports (VE_Ports). Although not shown for clarity to the drawings E_Ports are a type of port for connecting switches. The FCF_MAP is a unique identifier for the SAN Fabric 100. Again, while switches and switching fabric are used in the example of FIG. 1, examples are not limited to switches and switching fabric for network devices. And, while only two virtual domains 101-1 and 101-2 are shown, examples are not limited to two virtual domains. As used herein the term "virtual" in reference to a component, e.g., domain, port, connection and/or link, is intended to mean a logical connection versus an express physical connection. The term "virtual machine" is intended to mean a software instantiation of a physical host, e.g., physical computing component.

As shown in FIG. 1, the nodes in the distributed switch 101-1 of virtual domain "Z" can include a "first", e.g., controlling primary, FCF node (cp/FCF) 102-1 and a "second", e.g., controlling secondary, FCF node (cs/FCF) 102-2 each having their own principal domain identifier, e.g., "X" and "Y". Similarly, the distributed switch 101-2 of virtual domain "E" can include a "first", e.g., controlling primary, FCF node (cp/FCF) 102-3 and a "second", e.g., controlling secondary, FCF node (cs/FCF) 102-4 each having their own principal domain identifier, e.g., "C" and "D". The controlling primary and controlling secondary FCFs (cp/FCFs and cs/FCFs) 102-1, 102-2, 102-3 and 102-4 in each of the distributed switches, 101-1 of virtual domain "Z" and 101-2 of virtual domain "E", can further include links to a plurality of FDFs, e.g., 104-1, 104-2, 104-3, 104-4, associated with a cp/FCF or cs/FCF node, e.g., 102-1 and 102-2, in each virtual domain of the SAN Fabric. While only four FDFs are shown for ease of illustration, many more FDFs can be present as nodes in each distributed switch with links to multiple FCFs and to multiple hosts in as part of a switch fabric.

For native FC the FCF node is referred to as FCCF and the FDF node is referred to as FcDF. Examples can apply to both FC and FCoE networks. An FDF can be a top of rack ToR switch and an FCF can be an aggregation end of row EoR switch or director class switch as it is called in FC parlance. FCFs and FDFs are nodes within a network or in FC terms, a so called fabric. First and second, e.g., controlling primary and secondary FCFs (cp/FCFs and cs/FCFs), FDFs as well as virtual domains "Z" and "E" together with the FC-fabric "A" 100 form the fabric. FDFs are only visible within a virtual domain or distributed switch. Nodes are connected with links to form the SAN or "fabric". A fabric is a collection of switches which share a database and a so termed FC_MAP.

Links connect ports which are of various types N, F, A, E, etc., and described more below. For example, each FDF, 104-1, 104-2, . . . , 104-4, includes a number of "F" ports (F_Ports) and/or virtual F_Ports (VF_Ports). F_Ports are a type of port terminating at a switch and can connect the SAN fabric to "N" ports (N-Ports) and/or virtual N_Ports (VN_Ports) on a number of host devices in a network. N_Ports are a type of port designation on a host device for connecting to switches. In FIG. 1, a plurality of VN_Ports 112-1, . . . 112-N, VN_Port M and VN_Port P are shown connecting a plurality of hosts, e.g., clients, to the FDFs in the distributed switches 101-1 and 101-2 via a plurality of links.

As noted above, previous systems may detect a potential for a loss of traffic and may isolate one of the partitions. Thus, if a disruption in the exchange of information between a cp/FCF and a cs/FCF occurs in a distributed switch leading to a partition, one of the FCFs may be removed, even if temporarily. This can impact a large number of clients as each partition may contain hundreds or more client connections and this number is expected to grow as distributed switch architectures attempt to scale the network.

For the duration of an outage services may not be offered by a distributed switch. Outages are also monitored closely by the network and storage administrators to a network and are used as a metric for health of the service level agreements. Once a partition is restored and the distributed system is restored the clients form new connections to restore their service. However, the connection re-establishment is a fabric wide event and also impacts clients at the other end of the connection. As such, a lot of resources are taken up by this process.

Examples of the present disclosure resolve switch state synchronization issues between cp/FCFs and cs/FCFs attributed to link events, e.g., such as a partition in a distributed switch caused by link failures, or other events in the distributed system which may prevent the exchange of information. By providing an alternate address which always routes frames to a correct side of a partition, via a correct FCF, and by providing a tunneling mechanism between a controlling FCF(s) and the end switching hop (also referred to as a "penultimate switching hop") where a destination client resides, a distributed switch can use local state information to avoid loss of frame traffic and loss of network, e.g., fabric, service.

According to examples, described further below, program instructions, as stored in a fibre channel control stack and executable by a processing resource (e.g., within a control plane of a given switch), can execute instructions to monitor and detect a potential for a loss of traffic, e.g., a potential partition to a distributed switch caused by a link failure. According to examples described herein, the program instructions, e.g. control plane instructions of an FCF, can execute to change an address configuration in logic, e.g., hardware in the form of an application specific integrated circuit (ASIC) to provide an alternate address which always routes frames to a correct side of a partition, via a correct FCF, and to provide a tunneling mechanism between a controlling FCF and an end switching hop, e.g., penultimate switching hop, where the destination client resides. In this way, local state information to each of a cp/FCF and a cs/FCF can be used to avoid traffic loss, e.g., black holing, and loss of service to a network.

Figure 2:
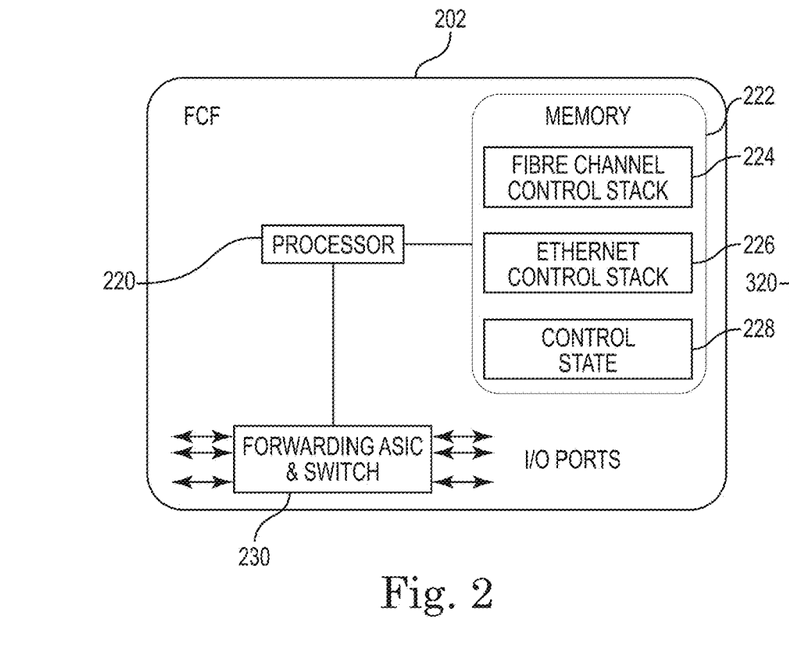
FIG. 2 illustrates an example of an FCoE forwarder (FCF) node according to the present disclosure.

FIG. 2 illustrates an example of an FCoE forwarder (FCF) node according to an example of the present invention. As shown in the embodiment of FIG. 2, an FCF node 202, e.g. as part of a virtual switch "Z", can include a processor 220, e.g. processing resource, coupled to a memory 222. The memory 222 may include a fibre channel control stack 224, e.g., control plane software (computer executable instructions or program instructions). The program instructions may be executed to perform acts in connection with the examples of the present invention, e.g., to configure hardware of the FCF node to employ an alternate address with encapsulation and implement a tunneling mechanism. Alternatively, the hardware may be configured to operate continuously in the manner described herein to enable a load balancing capability in the network and within the distribute switch reducing hot spots and associated latency.

The memory 222 associated with an FCF node 202 may further include an Ethernet control stack 226, and a control state 228, including instructions executable to track and monitor a connection state of a given host, e.g., host 112-1, ..., 112-N in FIG. 1. According to examples of the present invention, program instructions associated with the FCF 202 control stack 224 are executed by the processing resource 220 such that a potential for a loss of traffic or partition to a distributed switch, e.g., 101-1, is detected, frames will be routed to a correct side of a partition, via a correct FCF, and service can be continued to clients using local state information.

Figure 3:
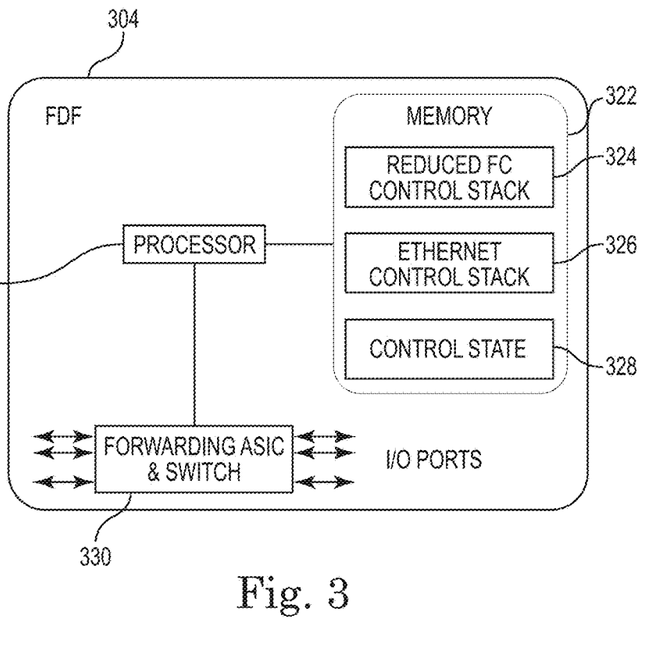
FIG. 3 illustrates an example of an FCoE data forwarder (FDF) node according to the present disclosure.

FIG. 3 illustrates an example of an FCoE data forwarder (FDF) node 304 according to an embodiment of the present invention. As shown in the embodiment of FIG. 3, an FDF node 304, e.g. as part of a virtual distributed switch "Z", can include a processor 320, e.g. processing resource, coupled to a memory 322. The memory 322 may include a "reduced" fibre channel control stack 324, e.g., control plane software (computer executable instructions or program instructions) relative to an FCF node. The memory 322 associated with an FDF node 304 may further include an Ethernet control stack 326, and control state 328, including instructions similar to that described in connection with FIG. 2.

In the example of FIG. 1, two controlling FCFs are shown within each distributed switch, e.g., primary (p) and secondary (s) controlling FCFs (cp/FCF 102-1 and cs/FCF 102-2) for virtual domain "Z". The cp/FCF 102-1 and cs/FCF 102-2 synchronize their local state for the virtual domain "Z" and act as redundant components for this domain. An inter-switch link, e.g., an augmented inter-switch link (AISL) can connect the cp/FCF 102-1 and cs/FCF 102-2 to the cp/FCF 102-1 and cs/FCF 102-2 to synchronize their local state. In this manner global state information is exchanged between nodes of the distributed switch 101-1 and virtual domain "Z" so that the nodes can behave as one switch. A similar operation and functionality applies equally to the nodes of distributed switch 101-2 and virtual domain "E" shown in FIG. 1.

According to embodiments, each controlling FCF 102-1 and 102-2 also has its own domain identity, "X" for cp/FCF 102-1 and "Y" for cs/FCF 102-2. The individual domain identities "X" and "Y" are used in the wider fabric consisting of domains "A", "X", "Y", "C", "D", "E", and "Z". The domain identity is similar to the concept of subnet addresses in Internet Protocol (IP) parlance. However, the domain identities "A", "X", "Y", "C", "D", "E", and "Z" are of fixed bit size in contrast to the variable bit size for subnet addresses. The cp/FCF 102-1 and the cs/FCF 102-2 use the domain ID "Z" for assigning addresses to all clients in domain "Z". The cp/FCF 102-1 and the cs/FCF 102-2 use the domain ID "X" and "Y" for all clients directly attached to the nodes "X" and "Y".

Figure 4:
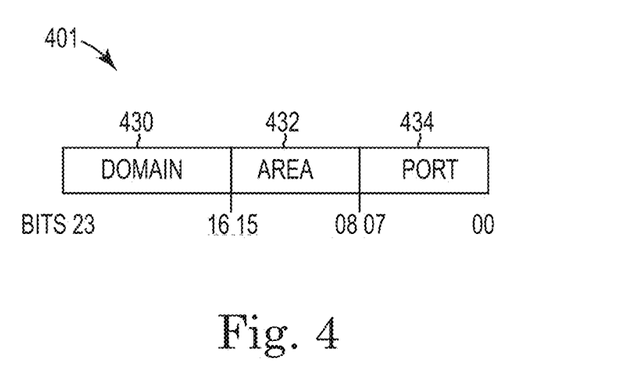
FIG. 4 illustrates the structure of the addresses and the address components used by controlling FCFs to assign addresses according to the present disclosure.

FIG. 4 illustrates the structure of the addresses and the address components. In FIG. 4 an example N_Port ID address format 401 is shown including a domain ID portion 430 having a fixed bit length, an area ID portion 432 having a fixed bit length, and a port ID portion 434 having a fixed bit length. The sample address format described herein and used in the frame headers can be carried and exchanged as a type, length, value (TLV) format used with control protocol exchanges. The example fixed bit length of 8 bits is used merely for illustration FIG. 4.

In this example, the domain ID portion 430 can identify the subnet address or switching node, e.g., domain "Z", "X", or "Y" in FIG. 1. The area ID portion 432 can identify an FDF, e.g., 104-1 and 104-2 in FIG. 1. The port ID portion 434 can identify a client, e.g., 112-1, ..., 112-N, attached to a port on the FDF.

Figure 5:
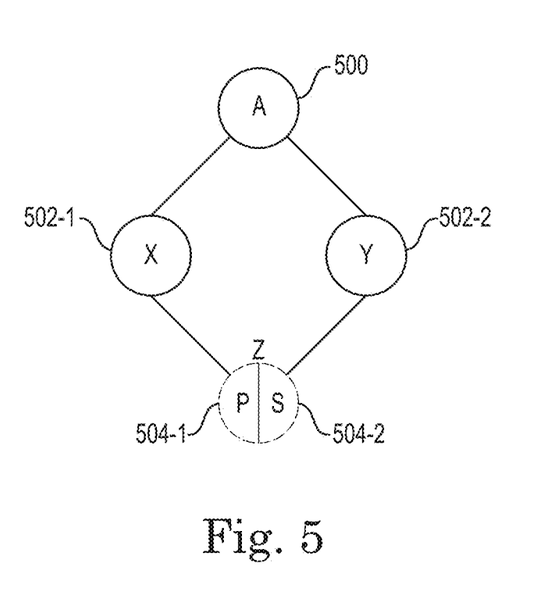
FIG. 5 provides an example of the routing topology of the fabric including distributed switch virtual domain "Z" shown in FIG. 1 according to the present disclosure.

FIG. 5 provides an example illustration of the routing topology of the fabric including distributed switch 101-1 of virtual domain "Z" shown in FIG. 1. In the example of FIG. 5, the forwarding is based on the domain ID (or subnet), e.g., domain "Z", "X", "Y", "C", "D", "E". As shown in FIG. 5, the forwarding can be based on a domain address for domain "Z" or "E" with forwarding to a correct FDF 504-1, 504-2, 504-3, or 504-4 handled by either the controlling primary FCF (cp/FCF) (502-1/502-3 respectively) or the controlling secondary FCF (cs/FCF) (502-2/502-4 respectively) using the area ID portion shown in FIG. 4. As described above an inter-switch link such as an augmented inter-switch link (AISL) is used for synchronization between cp/FCF 502-1 (102-1 in FIG. 1) and cs/FCF 502-2 (102-2 in FIG. 1), domains "X" and "Y". Additionally, traffic from node "A" 500 (101 in FIG. 1) to either clients VN_Port 1 (112-1 in FIG. 1) or VN_Port N (112-N in FIG. 1) may be forwarded by cp/FCF node 502-1 or cs/FCF node 502-2, via domains "X" or "Y".

The forwarding of frames uses a header field in the frame. The header field includes a destination identifier and a source identifier (address). The switch identifiers also referred to as domain identifiers A, X, Y, C, D, E and Z are part of the source and destination ID(s) and are used by the routing and forwarding logic described in connection with FIGS. 2 and 3.

As shown in FIG. 2, the processing resource 220 of an FCF can execute instructions received from the FC control stack 224 in the memory 222 to implement embodiments of the present invention. That is, in at least one embodiment, the processing resource 220 executes instructions to perform the acts described herein, directing hardware 230 (e.g., an ASIC) such as a forwarding switch 230 to receive and to send, e.g., to route packets, to and from input and output (I/O) ports as shown in FIG. 2.

In this example, once the augmented inter-switch links AISL(s) are lost, the distributed switch and its associated virtual domain Z is partitioned. Traffic from domain A, for domain Z may be forwarded to the wrong controlling FCF, in domain X or Y, and can be lost or as it is also referred to "black holed". As mentioned above, previous system approaches would be for the controlling secondary FCF (cs/FCF) to isolate itself from the fabric. However, this would cause all subtending client connections to sub-domain Y, e.g., VN_Port N, 112-N, to lose service.

Embodiments of the present disclosure, by contrast, provide distributed systems and methods to prevent the "black hole" forwarding and allow the clients to continue their operation. In at least one embodiment, this is achieved by providing an alternate address which always routes frames to the correct side of the partition, via the correct controlling FCF, e.g., the cp/FCF 102-1 or cs/FCF 102-2. The alternate address is used in the outer encapsulation of frames described next. Additionally, the tunneling mechanism is provided between a controlling FCF, e.g., the cp/FCF 102-1 or cs/FCF 102-2, and the end switching hop, referred to as the "penultimate" switching hop, where the destination client resides. The tunneling mechanism is implemented using the additional outer encapsulation, e.g., outer header.

As described above in connection with FIGS. 2 and 3, the alternate address and tunneling mechanism can be implemented by logic on and/or instructions executed by the controlling FCFs and by the penultimate switching hop. The alternate address and tunneling mechanism can be at work either continuously or activated once the partitioning of the distributed switch is detected, e.g., by detecting that the augmented inter switch link (AISL) is down between two controlling FCFs. Continuous use of the alternate address and tunneling mechanism can enable a load balancing capability where traffic returned to VN_Ports from the fabric switch A 100 is always returned via the FCF which was used for sending the frames from VN_Ports.

According to embodiments, an alternate address can be formed by the following two examples. In a first example, logic on the controlling FCFs partitions the area and port identifier portions of the X and Y address space amongst the Z domain and the X and Y domain. As shown below in connection with FIG. 6A, this area and port identifier address space can be broken down into area identifier portions S1 and S2. In this manner X.S1 and Y.S1 can serve as an alternate address for domains X and Y to an address Z.S1 to domain Z. Additionally, X.S2 and Y.S2 can be used for local clients, e.g., VN_Ports directly attached to the controlling FCFs of domains X and Y.

In a second example, logic on the controlling FCFs for both domains X and Y can obtain an alternate domain identifier from the fabric. In the scenario above, this could then be X1 and Y1 for domains X and Y of the distributed switch. In this second example, logic on and/or instructions executed by the controlling FCFs will create a one to one mapping between the Z domain and the X1 and Y1 domains.

Figure 6A:
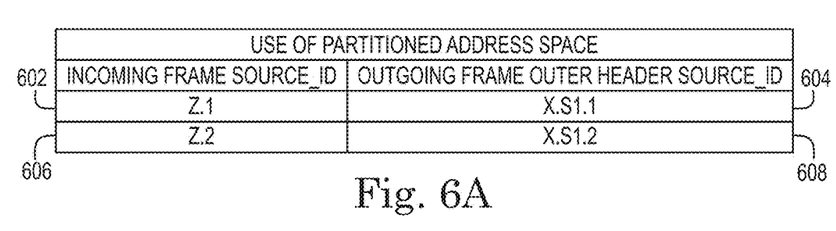
FIG. 6A illustrates an example table which uses a partitioned address space within a controlling FCF for the X domain with a couple of entries according to the present disclosure.
Figure 6B:
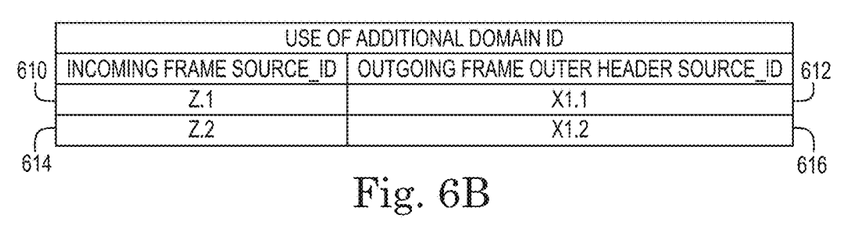
FIG. 6B illustrates an example table within a controlling FCF, which makes use of the additional domain ID from the fabric, for the X domain with a couple of entries according to the present disclosure.

Depending on the example implementation given above, instructions executed by the controlling FCF create a table, such as shown in FIG. 6A or 6B, within the controlling FCF which maps the incoming frames source_ID to the outer headers source_ID used by the tunneling mechanism for encapsulation.

FIG. 6A illustrates an example table which uses a partitioned address space within a controlling FCF for the X domain with a couple of entries. A similar table will be created within a controlling FCF for the Y domain and likewise for domain A. As shown in FIG. 6A, instructions executed by the controlling FCF create a table which maps an incoming frame source_ID for domain source address Z.1 to an outgoing frame outer header source_ID address X.S1.1. Likewise, as shown in the example table of 6A, instructions executed by the controlling FCF map an incoming frame source_ID for domain source address Z.2 to an outgoing frame outer header source_ID address X.S1.2. Logic on the controlling FCF for the X domain then implements the address conversion and encapsulation for tunneling.

FIG. 6B illustrates an example table within a controlling FCF, which makes use of the additional domain ID from the fabric, for the X domain with a couple of entries. Again in this example, a similar table will be created within a controlling FCF for the Y domain and likewise for domain A. As shown in FIG. 6B, instructions executed by the controlling FCF create a table which maps an incoming frame source_ID for domain source address Z.1 to an outgoing frame outer header source_ID address X1.1. Likewise, as shown in the example table of 6B, instructions executed by the controlling FCF map an incoming frame source_ID for domain source address Z.2 to an outgoing frame outer header source_ID address X1.2. Logic on the controlling FCF for the X domain then implements the address conversion and encapsulation for tunneling.

As shown next in connection with FIGS. 7A-7D, the tunneling is achieved with an additional outer encapsulation header to the frames. The original frame from domain Z is encapsulated in another header where the alternate address is used as the source identifier. Logic on the penultimate switch node, e.g., FCF A, C, or D, will detect and remove the additional outer encapsulation header and forward the original frame to its destination client. An example of frame routing for the incoming frame and the encapsulated outgoing frame are shown in FIGS. 7A-7D for both directions of an exchange.

Figure 7A:
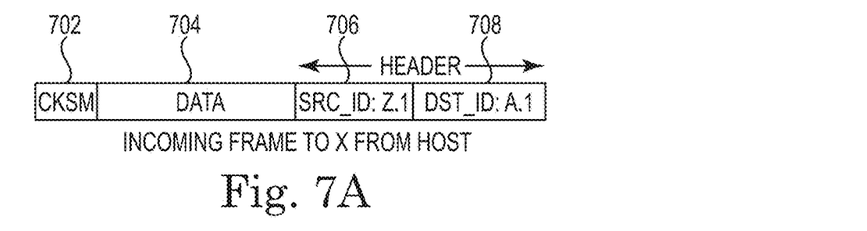
FIGS. 7A-7D illustrates an example of encapsulation used by a tunneling mechanism for routing frames in a distributed system according to the present disclosure.

FIG. 7A illustrates an incoming frame to domain X from a host, e.g., VN_Port 1 (112-1 in FIG. 1). As shown in FIG. 7A, in incoming frame to domain Z from a host, e.g., VN_Port 1 (112-1 in FIG. 1), can include a checksum portion 702, a data portion 704, and a header portion. As shown in FIG. 7A, the header portion will include a source identifier (ID) Z.1 706 and a destination ID A.1 708. In this example the source ID is from domain Z. The destination ID is to domain A.

Figure 7B:
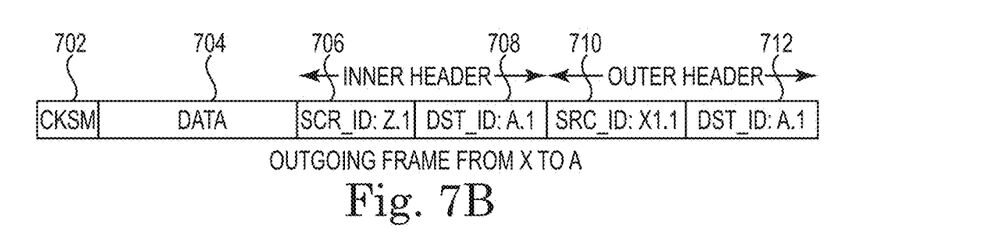

Next in the example of FIG. 7B, and outgoing frame from domain X to domain A is shown. Here, logic in the controlling FCF of domain X will encapsulate the frame with an additional outer header. The additional outer header will include a new source ID X1.1 710 (using the example alternate address technique described in connection with FIG. 6B) and provide the destination ID A.1 712.

Figure 7C:
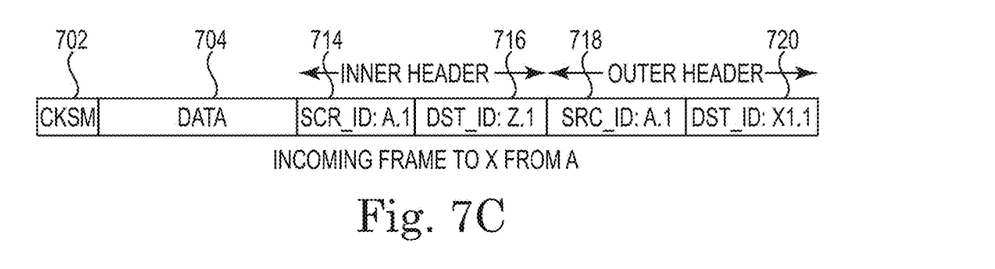

FIG. 7C illustrates an incoming frame to domain X from domain A. In this example incoming frame the inner header includes the source ID A.1 714 and the destination ID Z.1 716. The incoming frame further includes the encapsulated outer header for tunneling. According to embodiments described in connection with FIGS. 2 and 3, logic in the penultimate switching hop, e.g., FDF of domain A can encapsulate the frame with the additional outer header including the alternate address. The outer header in this example includes the source ID A.1 718 and destination ID X1.1 720.

Figure 7D:
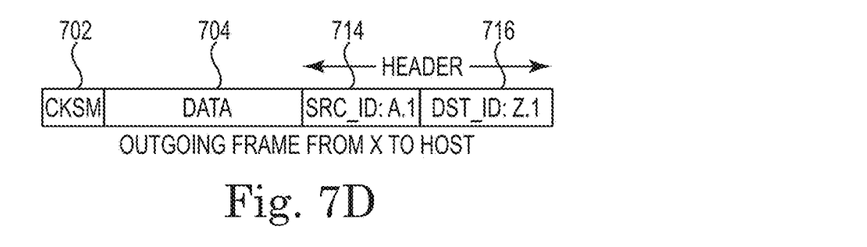

FIG. 7D then illustrates an example of the outgoing frame from domain X to the host, e.g., VN_Port 1 (112-1 in FIG. 1). Here logic in the FCF X, will remove the additional outer header before forwarding the frame on to the host via port 1. Thus, the logic leaves the original header having the destination ID Z.1 714 (domain Z) and the original source ID A.1 (domain A).

Arrival of encapsulated frames can trigger the use of tunneling for a client at the penultimate switching node, which may be in domain A or in the domain of the controlling primary FCF, e.g., Z(p), or in the domain of the controlling secondary FCF, e.g., Z(s). Reversion to normal headers can do the opposite. As such, activation of the tunneling may be inferred from the received frame. Alternatively, some form of control frame can be used between the ingress and the egress (penultimate) switching nodes for this purpose.

The egress (penultimate) switching node uses tables created as described in connection with FIGS. 6A and 6B to map the client address to the alternate address. For example, Z.1 inner address may map to X1.1 outer address and Z.2 may map to X1.2 outer address using the alternate address scheme described in connection with FIG. 6B. The mapping can be learned and implemented by logic upon arrival of encapsulated frames at the penultimate node and used, e.g., instructions executed, to populate the tables created within the controlling FCFs. At the ingress node, instructions can be executed for determination of the alternate address based on whether the alternate address scheme of FIG. 6A or 6B is used.

Figure 8:
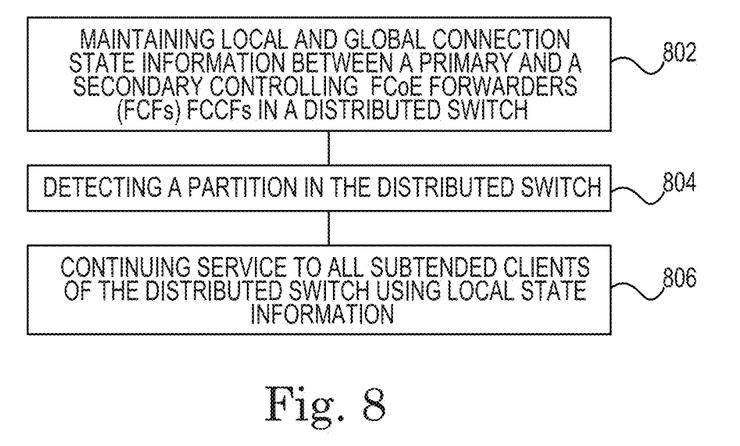
FIG. 8 illustrates an example method for continuing service in a distributed system according to the present disclosure.

FIG. 8 illustrates an example method for continuing service in a distributed system according to the present disclosure. As shown at block 802 the method can include maintaining local and global connection state information between a primary and a secondary controlling FCoE forwarder (cp/FCF and cs/FCF) in a distributed switch. Maintain local and global connection state information between a cp/FCF and a cs/FCF can involve hardware in the form of logic, software and an inter-switch link, e.g., AISL, as the same have been described in connection with FIGS. 1-3.

At block 804, the method can include detecting a potential loss of traffic, e.g., a partition, in the distributed switch. This can be due to a failure in the AISL or other link event in the distributed switch. Such a partition could lead to a "split brain" or "black holing" of traffic between the cp/FCF and the cs/FCF as the same has been described above.

At block 806, however, logic and instructions are used by controlling FCFs to continue service to all subtended clients of a partitioned distributed switch using local state information. To achieve the same, logic and instructions are executed by the controlling FCFs to create tables within the FCFs which provide a mapping between the domain of the partitioned distributed switch and the local domain of the controlling FCFs. This mapping is implemented in logic of the controlling FCFs and the end switching hops ("penultimate switching nodes") to provide and alternate address. The alternate address is to always route frames to a correct side of the partition, via a correct FCF. Tunneling is implemented by the logic between a controlling FCF and the penultimate switching hop where the destination client resides using an additional outer encapsulation header.

Figure 9:
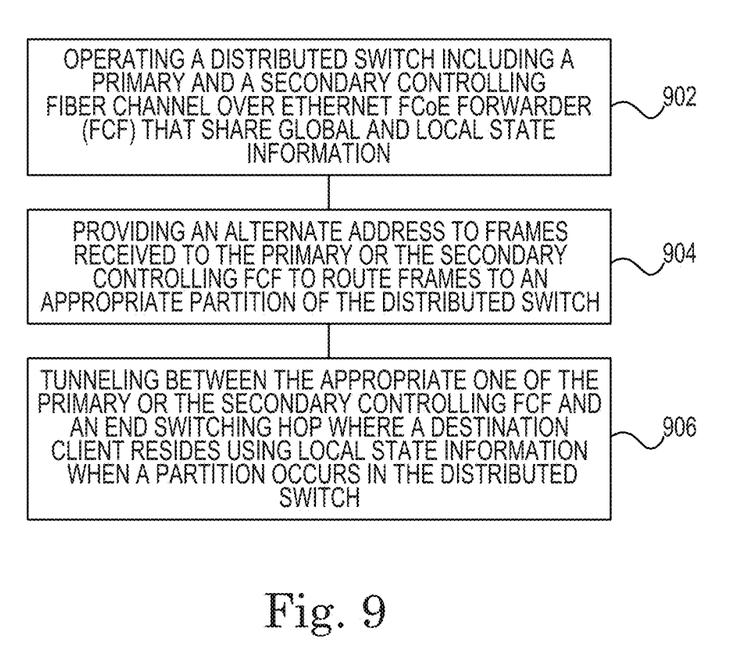
FIG. 9 illustrates an example method for operating a distributed system according to the present disclosure.

FIG. 9 illustrates an example method for operating a distributed system according to the present disclosure. As shown at block 902 the method includes operating a distributed switch including a primary and secondary controlling FCF (cp/FCF and cs/FCF) that share global and local state information for the distributed switch.

At 904, logic and software are used by the controlling FCFs to provide an alternate address to frames received to the cp/FCF and cs/FCF to route frames to an appropriate partition of the distributed switch enabling load balancing. An example of the logic and instructions used by the controlling FCFs to provide the alternate address is described in connection with FIGS. 4-7D.

At block 904, the above described logic encapsulates frames with the alternate outer address header to tunnel between the appropriate one of the cp/FCF and cs/FCF and the end switching hop ("penultimate switching node") where a destination client resides using local state information when a partition occurs in the distributed switch. When used continuously, the outer encapsulation address header offers a technique for load balancing traffic in a network. That is, in the above examples, traffic destined to domain Z will be sent via domain X or domain Y FCFs depending on the outer encapsulation.

Hence, embodiments disclosed herein can allow for continuous operation of a client connection in the face of a distributed system partition, prevents "black holing" of traffic, and may reduce the occurrence of network outages. Partitions formed as a result of spurious link up/down events can recover and allow the distributed system to reform and converge. This may improve the service level agreement for any transport technology which is often the cause of service calls and complaints about outages. Fabric wide events may be reduced. Associated end points are not affected. For some technologies such as storage a large number of connections converge on a single target. The processing load for re-establishing such a large number of connections on the target can be heavy and lengthy and hence may be avoided by the embodiments described in this disclosure. In networks, the load balancing of traffic capabilities of the embodiments, and within a distributed switch, may reduce hot spots and associated latency.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure. As used herein, the designators "A", "X", "Y", "Z", "E", "C", "D", "M", "N," "M," "P", etc., particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 FIG. 2 and/or 302 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

What is claimed:

1. A method for client service in a distributed switch, comprising:
maintaining local and global connection state information between a primary and a secondary controlling fibre channel (FC) over Ethernet (FCoE) Forwarders (FCFs) or FC forwarder in a distributed switch;
detecting a partition in the distributed switch, wherein the partition is a split of a system into at least two sides and nodes in one side are unaware of a control state of nodes in another side; and
continuing service to all subtended clients of the distributed switch using local state information, wherein continuing service to all subtended clients of the distributed switch includes:
providing an alternate address to route frames to an appropriate side of the partition via an appropriate one of the primary or the secondary FCF in the partition; and
providing a tunneling mechanism between the appropriate one of the primary or the secondary controlling FCF and an end switching hop where a destination client resides;
wherein the end switching hop uses the tunneling mechanism, even in absence of the partition, to select one of the primary or the secondary FCF for routing of packets to a destination host to control and balance routing traffic in the distributed system.

2. The method of claim 1, wherein providing the alternate address and providing the tunneling mechanism comprises continuing service to each side of the partition to prevent a loss of frame traffic while re-establishing a link that caused the partition.

3. The method of claim 1, wherein:
providing the alternate address includes adding an encapsulation header to a frame received by an FCF in the partition to identify a unique address to the appropriate one of the primary or the secondary controlling FCF; and
providing the tunneling mechanism includes using the unique address in the encapsulation header to tunnel the frame from the end switching hop where the destination client resides.

4. The method of claim 3, wherein providing the alternate address, comprises:
partitioning an area identifier and a port identifier portion of an address space between a principal domain and an alternate address space of the distributed switch.

5. The method of claim 3, wherein providing the alternate address comprises:
providing alternate domain IDs within a fabric to the primary and the secondary FCFs in a virtual domain of the distributed switch; and
creating a one to one mapping between the virtual domain and the alternate domain IDs.

6. The method of claim 4, wherein the method, comprises:
creating a table within the primary and the secondary FCFs to map a virtual domain source ID for an incoming frame incoming to the primary or the secondary FCFs frame with an outer header source ID encapsulated to the incoming frame which uniquely identifies the primary and the secondary FCFs.

7. A system, comprising:
a distributed switch seen as a single entity to a network fabric, the distributed switch having a first controlling fibre channel over Ethernet forwarder (FCF) and a second controlling FCF, the distributed switch having links to the network fabric; and
a processor coupled to memory and logic and configured to:
provide an alternate address and encapsulation to route frames to an appropriate side of a partition of the distributed switch, wherein the partition is a split of a system into at least two sides and nodes in one side are unaware of a control state of nodes in another side;
apply a tunneling mechanism to use the alternate address to tunnel between the appropriate one of the first or the second controlling FCF and an end switching hop where a destination client resides; and
apply the tunneling mechanism such that the end switching hop can use the tunneling mechanism to select one of the primary or the secondary FCFs for routing of packets to a destination host to load balance in the distributed switch and the system.

8. The system of claim 7, wherein the logic of the first and the second controlling FCFs comprises logic to:
continue service to each side of the partition to prevent a loss of frame traffic when the partition occurs in the distributed switch, while re-establishing a link that caused the partition.

9. The system of claim 7, wherein the first and the second controlling FCFs include logic to encapsulate a frame received to the first or the second controlling FCF with the alternate address when the partition to the distributed switch is detected.

10. The system of claim 9, wherein the first and the second controlling FCFs include logic to process a tunneled frame to a destination client when the frame arrives encapsulated with the alternate address.

11. The system of claim 7 wherein the logic of the first and the second controlling FCFs comprises logic to:
provide a tunneling mechanism between the appropriate one of the first or the second controlling FCF and an end switching hop where a destination client resides.

12. The system of claim 7 wherein the logic of the first and the second controlling FCFs comprises logic to:
add an encapsulation header to a frame received by an FCF in the partition to identify a unique address to the appropriate one of the first or the second controlling FCF; and use the unique address in the encapsulation header to tunnel a frame from the end switching hop.

13. The system of claim 12 wherein the logic of the first and the second controlling FCFs comprises logic to:
partition an area identifier and a port identifier portion of an address space between a principal domain and an alternate address space of the distributed switch.

14. The system of claim 12 wherein the logic of the first and the second controlling FCFs comprises logic to:
provide alternate domain IDs within a fabric to the first and the second FCFs in a virtual domain of the distributed switch; and
create a one to one mapping between the virtual domain and the alternate domain IDs.

15. The system of claim 13 wherein the logic of the first and the second controlling FCFs comprises logic to:
create a table within the first and the second FCFs to map a virtual domain source ID for an incoming frame incoming to the first or the second FCFs frame with an outer header source ID encapsulated to the incoming frame which uniquely identifies the first and the second FCFs.

16. A distributed switch in a network, comprising:
a first fibre channel over Ethernet forwarder (FCF);
a second FCF;
a link connecting the first and the second FCFs to exchange global state information between with the first the second FCFs, and
a processor coupled to memory and logic and configured to:
receive a frame from a port;
detect a partition in the distributed switch wherein the partition is a split of a system into at least two sides and nodes in one side are unaware of a control state of nodes in another side;
maintain a table in each FCF to map a source or a destination address for the distributed switch in the network to a different address for the first or the second controlling FCF and
continue service to all subtended clients of the distributed switch using local state information, wherein continuing service to all subtended clients of the distributed switch includes:
providing an alternate address to route frames to an appropriate side of the partition via an appropriate one of the first or the second FCF in the partition; and
providing a tunneling mechanism between the appropriate one of the first or the second controlling FCF and an end switching hop where a destination client resides;
wherein the end switching hop uses the tunneling mechanism, even in absence of the partition, to select one of the primary or the secondary FCF for routing of packets to a destination host to control and balance routing traffic in the distributed system.

17. The distributed switch of claim 16, wherein the first and the second controlling FCF include logic to remove an encapsulation header of the frame routed to the first or the second FCF and route the frame to a port where a destination client resides.

* * * * *